US008287358B2

(12) United States Patent
Aoki

(10) Patent No.: US 8,287,358 B2

(45) Date of Patent: Oct. 16, 2012

(54) WAGERING GAMES WITH VARIABLE REEL SIZES AND GAMING DEVICES FOR PLAYING THE SAME

(75) Inventor: Dion K. Aoki, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 260 days.

(21) Appl. No.: 12/751,498

(22) Filed: Mar. 31, 2010

(65) Prior Publication Data

US 2011/0244942 A1 Oct. 6, 2011

(51) Int. Cl.
*A63F 9/24* (2006.01)
*A63F 13/00* (2006.01)

(52) U.S. Cl. ................................ 463/20; 463/16; 463/29

(58) Field of Classification Search .............. 463/16–20, 463/25, 29; 273/138.1, 139
See application file for complete search history.

(56) References Cited

U.S. PATENT DOCUMENTS 4,198,052 A 4/1980 Gauselmann ................ 273/143
4,365,810 A 12/1982 Richardson .................. 273/237
4,661,906 A 4/1987 DiFrancesco et al. ........ 364/410
4,858,932 A * 8/1989 Keane ............................ 463/21
5,413,342 A 5/1995 Kaplan .......................... 273/143
5,580,053 A 12/1996 Crouch .......................... 463/20
5,609,524 A 3/1997 Inoue ............................ 463/20
5,611,535 A 3/1997 Tiberio .......................... 273/143
5,697,843 A 12/1997 Manship et al. ............... 463/20
5,704,835 A 1/1998 Dietz, II ......................... 463/20
5,807,172 A 9/1998 Piechowiak ..................... 463/20
5,851,148 A 12/1998 Brune et al. .................... 463/25
6,004,208 A 12/1999 Takemoto et al. .............. 463/20
6,220,959 B1 4/2001 Holmes, Jr. et al. ............ 463/13
6,241,607 B1 6/2001 Payne et al. ..................... 463/20
6,322,445 B1 11/2001 Miller ............................ 463/13
6,604,999 B2 * 8/2003 Ainsworth ...................... 463/20
6,676,511 B2 1/2004 Payne et al. ..................... 463/20
6,796,903 B1 * 9/2004 Bryant ........................... 463/20
8,096,869 B2 * 1/2012 Yoshimi .......................... 463/20
(Continued)

FOREIGN PATENT DOCUMENTS

JP 2005-192659 A 7/2005
(Continued)

OTHER PUBLICATIONS

European Search Report for European Application No. 99/21514 dated Oct. 10, 2002; (1 page).

*Primary Examiner* — Milap Shah
(74) *Attorney, Agent, or Firm* — Nixon Peabody LLP

(57) ABSTRACT

Gaming devices, gaming systems, methods of conducting a wagering game, and computer programs for initiating a wagering game are presented herein. A gaming device is presented that includes a wager input device, a display, and a wagering game. The wagering game includes a plurality of reels each having distinct symbol positions and bearing an array of symbols. Some of the symbols are grouped into corresponding symbol clumps. A window is associated with each of the reels. The display displays outcomes of the wagering game. Some of the outcomes are represented by a segment of each reel being displayed through a respective one of the windows. The probability that a particular one of the windows will be filled with one of the symbol clumps as part of an outcome decreases between at least two of the windows.

24 Claims, 14 Drawing Sheets

U.S. PATENT DOCUMENTS

| | | | | |
|---|---|---|---|---|
| 2004/0048646 | A1* | 3/2004 | Visocnik | 463/16 |
| 2004/0058727 | A1* | 3/2004 | Marks et al. | 463/20 |
| 2004/0087354 | A1* | 5/2004 | Ellis | 463/16 |
| 2006/0183534 | A1* | 8/2006 | Yoshimi | 463/20 |
| 2007/0287529 | A1* | 12/2007 | Kojima | 463/20 |
| 2008/0108411 | A1* | 5/2008 | Jensen et al. | 463/20 |
| 2009/0227330 | A1* | 9/2009 | Saito | 463/20 |
| 2010/0056252 | A1* | 3/2010 | Englman et al. | 463/20 |
| 2010/0210343 | A1* | 8/2010 | Englman et al. | 463/20 |

FOREIGN PATENT DOCUMENTS

| | | | |
|---|---|---|---|
| JP | 2009-183679 | A | 8/2009 |
| WO | WO 95/08799 | | 3/1995 |
| WO | WO 2008/085294 | | 7/2008 |

* cited by examiner

WAGERING GAMES WITH VARIABLE REEL SIZES AND GAMING DEVICES FOR PLAYING THE SAME

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming devices and methods for playing wagering games. More particularly, the present invention relates to wagering games with different reel sizes and gaming devices for playing a wagering game with different reel sizes.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators strive to employ the most entertaining and exciting machines, features, and enhancements available because such machines attract frequent play and hence increase profitability to the operator.

One concept that has been successfully employed to enhance the entertainment value of a game is the concept of a “secondary” or “bonus” game that may be played in conjunction with a “primary” or “basic” game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Wagering games may additionally award players with “progressive jackpot” awards that are funded, at least in part, by a percentage of coin-in from the gaming machine or a plurality of participating gaming machines.

There is still a need for additional concepts to enhance the entertainment value of standard slot-type games. Although a lot of focus is now being paid to enhancing bonus games, there is still a lot of room for improving the basic wagering game.

SUMMARY OF THE INVENTION

According to one aspect of the present invention, a gaming device for playing a wagering game is featured. The gaming device includes a wager input device for receiving wagers from players to play the wagering game, and a display for displaying outcomes of the wagering game. The wagering game includes a plurality of reels, each of which has a plurality of distinct symbol positions and bear an array of symbols. At least two of the reels each bear at least one of a plurality of symbol clumps. The wagering game also includes a plurality of windows, each of which is associated with a respective one of the reels. At least a portion of the wagering game outcomes are represented by a segment of each reel being displayed through a respective one of the plurality of windows. In this embodiment, the probability of a particular one of the windows including at least one of the plurality of symbol clumps as part of an outcome decreases between at least two of the plurality of windows.

According to another aspect of the invention, a gaming system for conducting a wagering game is presented. The gaming system includes means for receiving a wager from a player to play the wagering game. The wagering game includes a plurality of reels, each of which has a plurality of distinct symbol positions and bear an array of symbols. At least some of the symbols are grouped into corresponding ones of a plurality of symbol clumps. Each symbol clump comprises one or more identical symbols occupying two or more of the symbol positions located immediately adjacent one another on one of the reels. The gaming system also includes means for receiving input from the player, and means for displaying an outcome of the wagering game. The outcome is randomly selected from a plurality of wagering game outcomes. At least a portion of the wagering game outcomes are represented by a segment of each reel being displayed through a respective one of a plurality of windows. The probability of a particular one of the plurality of windows including one of the plurality of symbol clumps as part of an outcome decreases from window-to-window in a direction along the at least one display.

According to yet another aspect of the invention, a method of conducting a wagering game on a gaming device and/or gaming system is presented. The method comprises: initiating the wagering game using at least one processor, the wagering game including a plurality of reels each having a plurality of distinct symbol positions and bearing an array of symbols, at least some of the symbols being grouped into corresponding ones of a plurality of symbol clumps, each of the symbol clumps comprising one or more identical symbols occupying two or more of the symbol positions located immediately adjacent one another on one of the reels; determining, via at least one processor, an outcome of the wagering game, the outcome being randomly selected from a plurality of wagering game outcomes; and causing at least one display device to display the wagering game outcome represented as a segment of each reel being displayed through a respective one of a plurality of windows, wherein a probability of a particular one of the plurality of windows including one of the plurality of symbol clumps as part of one of the game outcomes decreases from window-to-window in a direction along the at least one display According to even yet another aspect of the invention, a computer readable storage media is encoded with instructions for directing a gaming system to perform the above methods.

The above summary of the invention is not intended to represent each embodiment or every aspect of the present invention. Rather, the summary merely provides an exemplification of some of the novel features featured herein. The above features and advantages, and other features and advantages of the present invention, will be readily apparent from the following detailed description of the embodiments and best modes for carrying out the present invention when taken in connection with the accompanying drawings and appended claims.

Figure 1A:
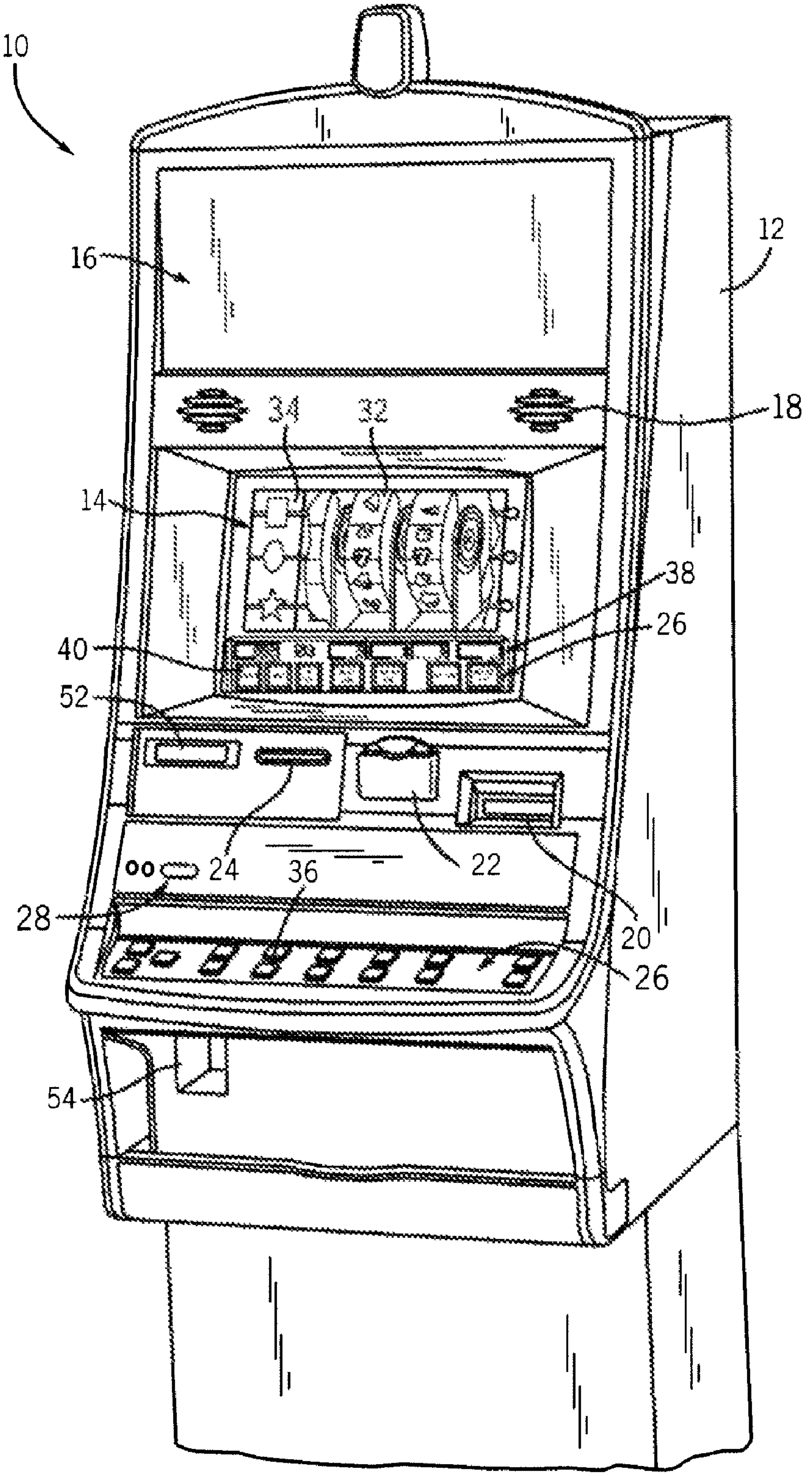
FIG. 1A is a perspective-view illustration of an exemplary free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE EXEMPLARY EMBODIMENTS

While this invention is susceptible of embodiment in many different forms, there is shown in the drawings and will herein be described in detail representative embodiments of the invention with the understanding that the present disclosure is to be considered as an exemplification of the various aspects and principles of the invention, and is not intended to limit the broad aspect of the invention to the embodiments illustrated. To that extent, elements and limitations that are disclosed, for example, in the Abstract, Summary of the Invention, and Detailed Description of the Embodiments sections, but not explicitly set forth in the claims, should not be incorporated into the claims, singly or collectively, by implication, inference or otherwise.

Referring to FIG. 1A, a perspective-view illustration of an exemplary gaming terminal 10 (also referred to herein as "wagering game machine" or "gaming machine") is shown in accordance with one embodiment of the present invention. The gaming terminal 10 of FIG. 1 may be used, for example, in traditional gaming establishments, such as casinos, and non-traditional gaming establishments, such as pools, hotels, restaurants, and airports. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, a mobile telecommunications device such as a mobile telephone or personal digital assistant (PDA), a counter-top or bar-top gaming terminal, or other personal electronic device, such as a portable television, MP3 player, entertainment device, etcetera. Finally, the drawings presented herein are not to scale and are provided purely for instructional purposes; as such, the individual and relative dimensions shown in the drawings are not to be considered limiting.

The gaming terminal 10 illustrated in FIG. 1A comprises a cabinet or housing 12. For output devices, this embodiment of the gaming terminal 10 includes, for example, a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1A includes, for example, a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433, to Loose et al., entitled "Reel Spinning Slot Machine with Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1A. The primary display area 14 includes, in relation to many aspects of wagering games conducted on the gaming terminal 10, one or more paylines 30 (see FIG. 3) extending along a portion of the primary display area.

In the illustrated embodiment of FIG. 1A, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1A is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1A, a mouse, a joy stick, a switch, a microphone, and/or a touch screen 38 mounted over the primary display area 14 and/or the secondary display area 16 and having one or more soft touch keys 40, as is also shown in FIG. 1A. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, to Giobbi, which is entitled "Portable Data Unit for Communicating with Gaming Machine over Wireless Link," and is incorporated herein by reference in its entirety. The noted account associated with cashless gaming is, in some aspects of the present concepts, stored at an external system 46 (see FIG. 2) as more fully disclosed in U.S. Pat. No. 6,280,328, to Holch et al., which is entitled "Cashless Computerized Video Game System and Method," and is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 1B:
FIG. 1B is a perspective-view illustration of an exemplary handheld gaming device according to an embodiment of the present invention.

Depicted in FIG. 1B is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1B, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1B, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1B, comprises a biometric sensing device.

The handheld device may incorporate the same features as the gaming terminal 10, or variations thereof. A more detailed description of a handheld device that may be utilized with the present invention can be found in PCT Patent Application No. PCT/US2007/000792, filed Jan. 26, 2007, and entitled "Handheld Device for Wagering Games," which is incorporated herein by reference in its entirety.

Figure 2:
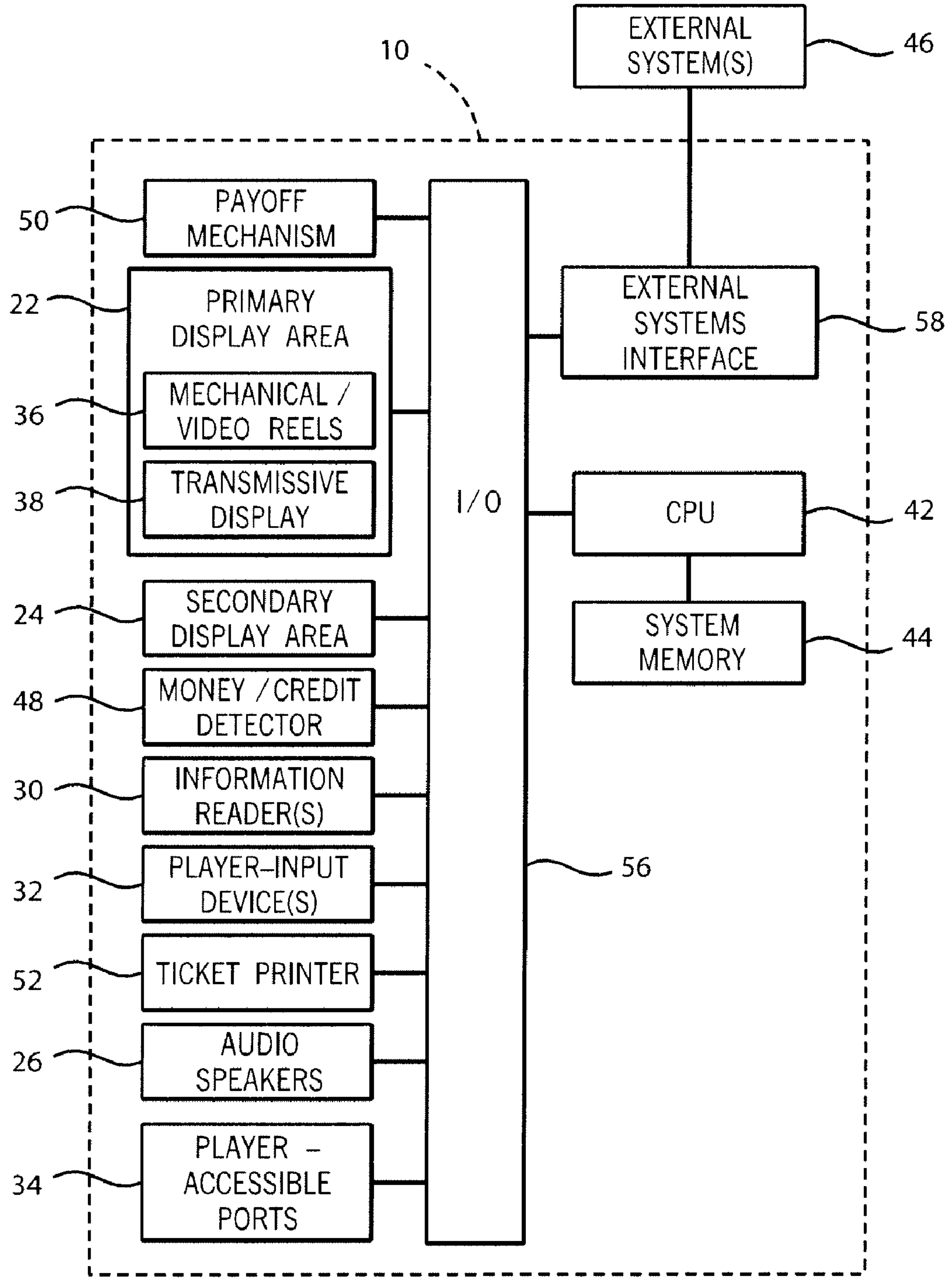
FIG. 2 is a schematic diagram of an exemplary gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
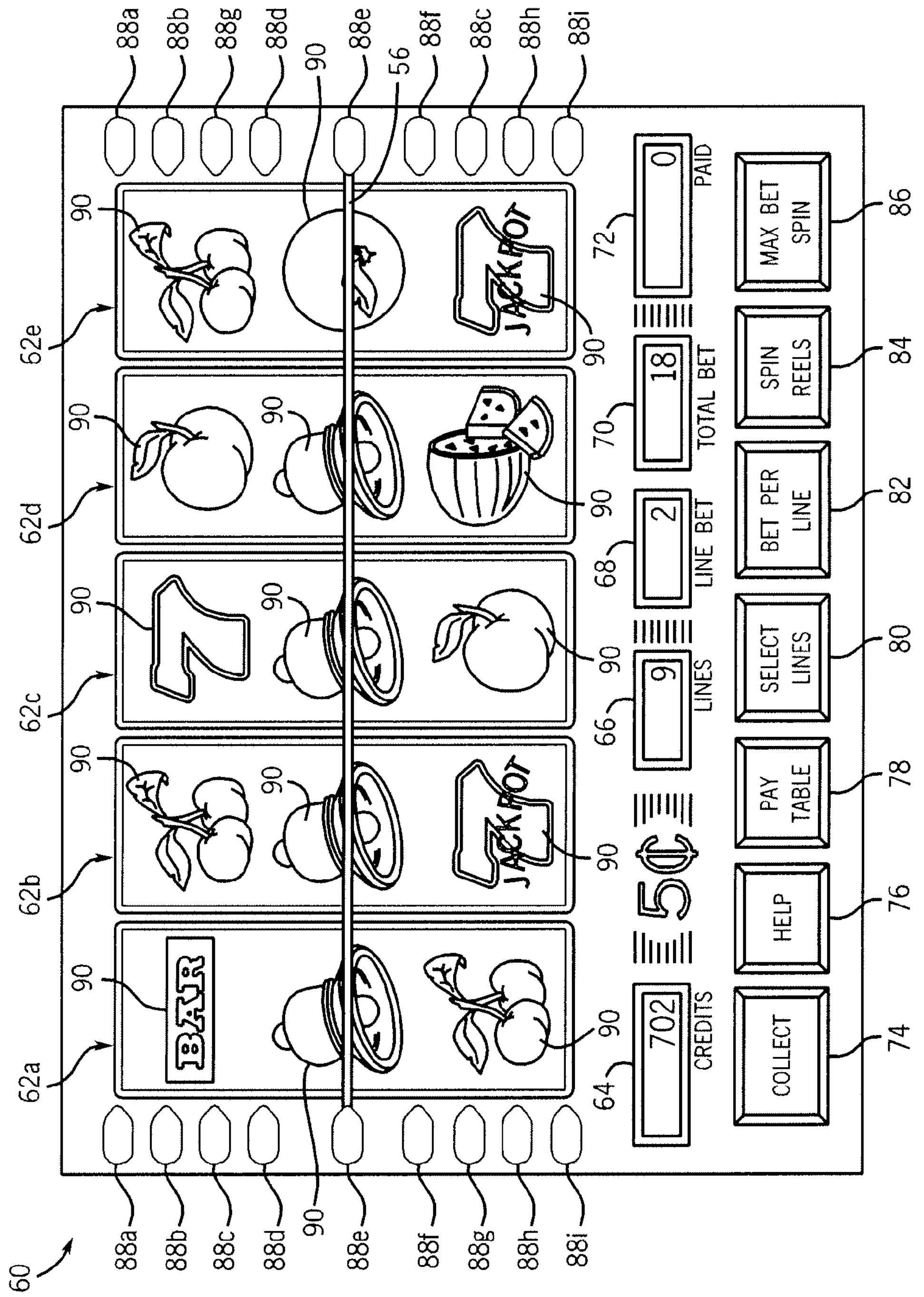
FIG. 3 is a screen shot of a basic-game screen from an exemplary wagering game that may be played on the gaming terminal of FIG. 1A, the handheld gaming device of FIG. 1B, and the gaming system of FIG. 2.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming terminal or gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1A, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example).

As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
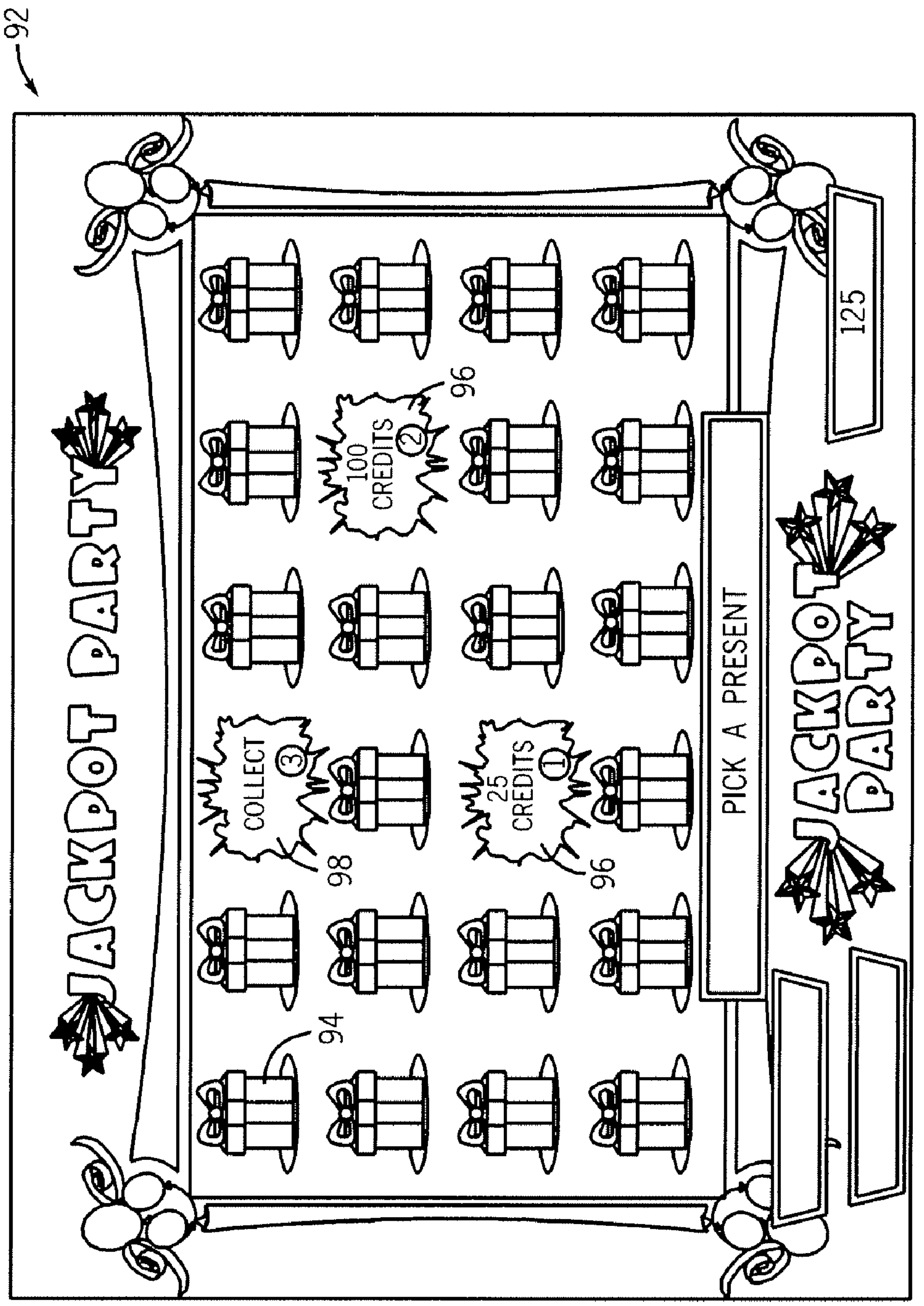
FIG. 4 is a screen shot of a bonus-game screen from an exemplary wagering game that may be played on the gaming terminal of FIG. 1A, the handheld gaming device of FIG. 1B, or the gaming system of FIG. 2.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
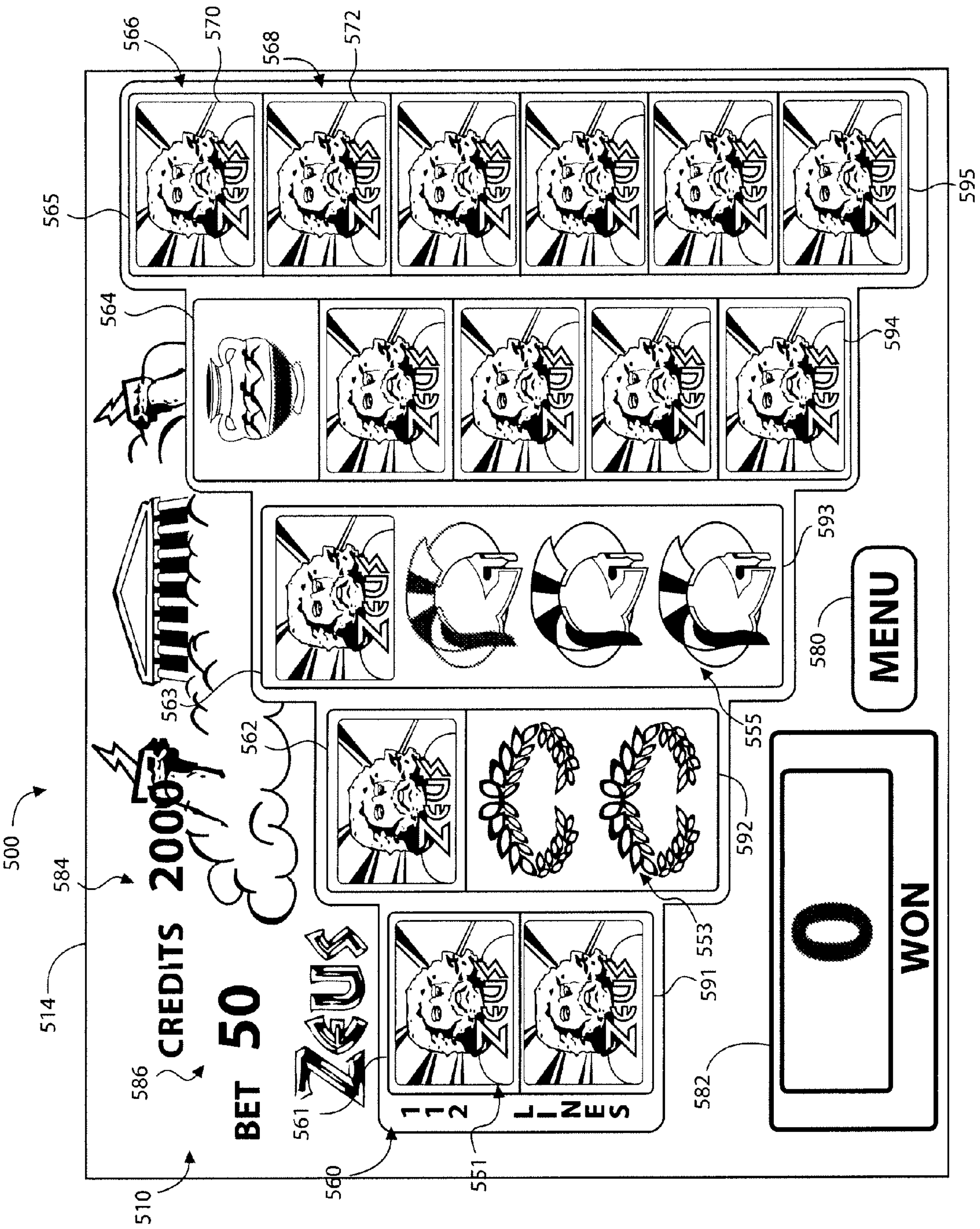
FIG. 5 is a screen shot of a display displaying an exemplary wagering game with a REEL BOOST™ feature in accordance with an embodiment of the present invention.

Referring now to FIG. 5, a primary display 514 of a gaming device or terminal 510 of a gaming system 500 is shown. The device or terminal 510 may be a freestanding gaming device (networked or standalone) as seen in FIG. 1A, a handheld gaming device as seen in FIG. 1B, or any other device having a display 514. The display 514 may be any form of display, such as those described with reference to the free standing and handheld devices of FIGS. 1A and 1B, respectively.

The display 514 includes a display of a wagering game 560, which in this example is the slot game shown in FIG. 5. The wagering game 560 includes a plurality of symbol-bearing reels 561-565 each having a plurality of distinct symbol positions (collectively represented by first and second symbol positions 566 and 568 in FIG. 5) and bearing an array of symbols (collectively represented by first and second symbols 570 and 572 in FIG. 5), as described below. The wagering game 560 can include fewer or additional symbol-bearing reels than those shown in FIG. 5—such as an additional, sixth reel 566 shown in FIG. 6. The symbols may include any variety of graphical symbols, emblems, elements, or representations, including symbols that are associated with one or more themes (e.g., a Greek mythology theme) of the gaming terminal 510 or system 500. The symbols may also include a blank symbol or empty space. The reels 561-565 are varied (e.g., spun and stopped) to reveal combinations of symbols, which represent randomly selected outcomes of the wagering game 560, that are evaluated for winning combinations. Winning combinations of symbols landing on activated paylines (those paylines for which a wager has been received), cause awards to be paid in accordance with one or more paytables associated with the gaming system 500.

Some of the symbols in the wagering game 560 of FIG. 5 may be grouped into a corresponding clump of symbols. As used herein, the term "clump" or "symbol clump" refers to one or more of the same symbols occupying two or more symbol positions that are located immediately adjacent one another on a single reel. For instance, referring back to FIG. 5, a clump of two adjacent "Zeus" symbols, designated generally as 551, is shown on the first reel 561, whereas a clump of two adjacent wreath symbols, designated generally as 553, is shown on the second reel 562, and a clump of three adjacent Spartan helmet symbols, designated generally as 555, is shown on the third reel 563. In an alternative configuration, a clump may comprise a single, elongated or enlarged symbol (not shown) that occupies two or more adjacent symbol positions on a single reel. In yet a further alternate arrangement, a clump may comprise one or more elongated symbols, alone or in combination with one or more standard-sized symbols that occupy numerous symbol positions that are all immediately adjacent one another on a single reel. In some embodiments, each of the symbol clumps is evaluated as a unitary element in determining whether the outcome represents a winning outcome.

Figure 12:
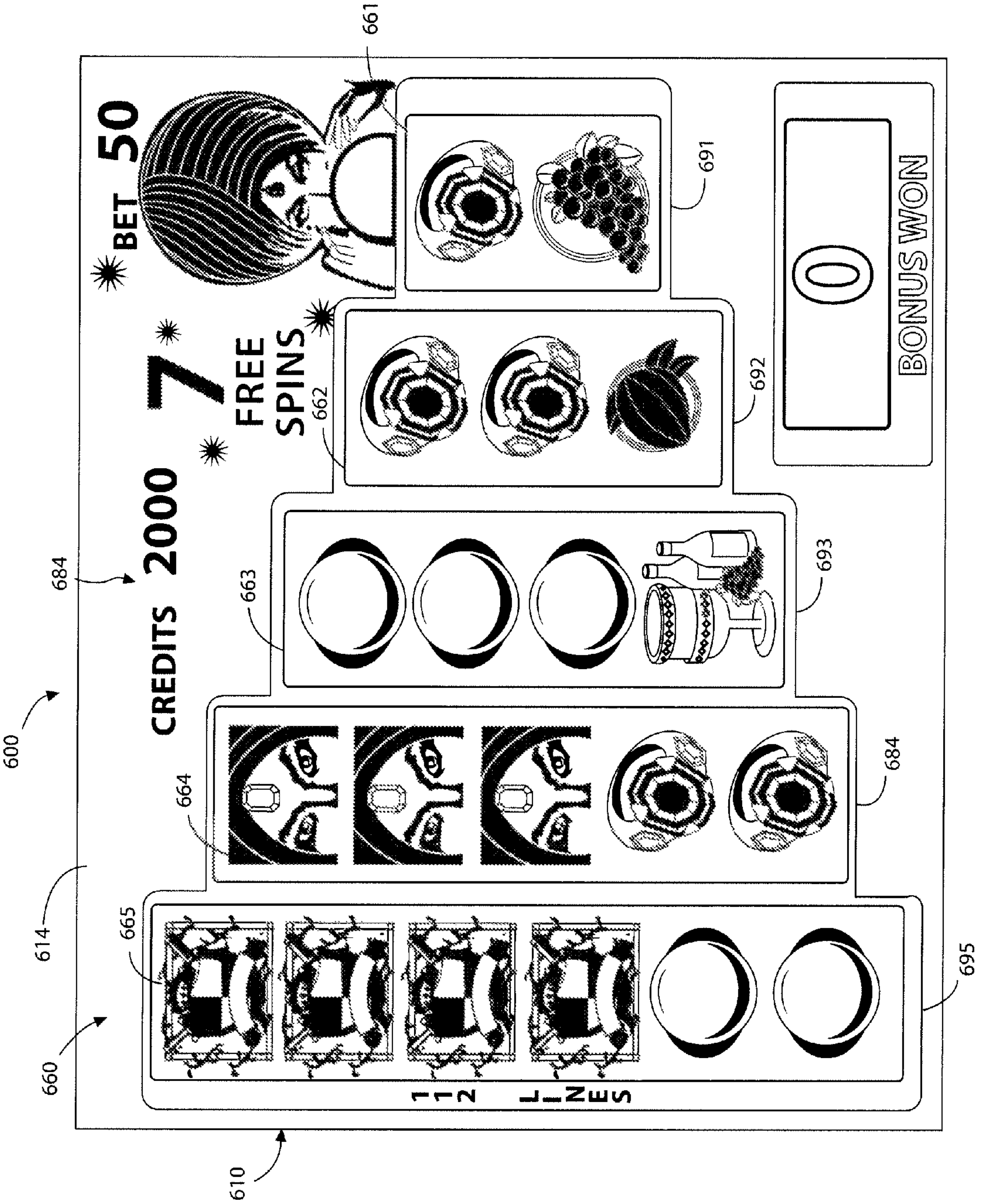
FIG. 12 is a screen shot of a display displaying an exemplary wagering game with a REEL BOOST™ feature in accordance with an embodiment of the present invention, showing the order in which the reels are displayed being reversed in response to a triggering event.

The primary display 514 further includes certain display features for providing information and options to a player. For example, the display features may include a MENU button 580, a WON meter 582, a CREDITS meter 584, and a BET meter 586. The MENU button 580 can be pressed and activated (e.g., through an overlying touch screen for example) by a player desiring to access other control menus, preferences, help screens, etc. For example, the player can change a theme of the wagering game 560 via the MENU button 580, or change the window-size order from short to tall as shown in FIG. 5 or tall to short as shown in FIG. 12. The WON meter 582 displays to the player the amount of the total win (if any) from the most recent play of the wagering game 560. The CREDITS meter 584 displays to the player the total amount of credits (if any) remaining and available to the player for play of the wagering game 560. The BET meter 586 displays to a player the current size of his/her wager (in credits). Fewer, additional or alternative display features may be included for presenting information/options to a player, such as a "Denomination" button (not shown) that can be activated to change the denomination of wagers which the player is inputting into the system 500, "Bet Change" buttons that permit a player to increase and/or decrease the size of his/her wager accordingly, a "max bet spin" button for wagering a maximum number of credits and spinning the reels of the wagering game 560, as well as any of the credits and meters displayed in FIG. 3.

Each of the reels 561-565 in the wagering game 560 of FIG. 5 is associated with a respective window 591-595. As indicated above, at least a portion of the wagering game outcomes is represented by a segment of each reel 561-565 being displayed through a respective one of the windows 591-595. That is, after the reels 561-565 are varied (e.g., spun and stopped), a segment of the first reel 561 is displayed in the first window 591, a segment of the second reel 562 is displayed in the second window 592, a segment of the third reel 563 is displayed in the third window 593, a segment of the fourth reel 564 is displayed in the fourth window 594, and a segment of the fifth reel 565 is displayed in the fifth window 595. Fewer or additional windows than those shown in FIG. 5 may be included in the wagering game 560, such as, for example, an additional, sixth window 596 shown in FIG. 6 in which a segment of the sixth reel 566 is shown. Recognizably, a delineable window being displayed via the display 514 is not necessarily required to effectuate the premise of the windows 591-595; rather, the display 514 revealing a selected portion of each reel 561-565 as a collective representation of an outcome to the wagering game 560 can suffice.

Each window 591-595 is sized to correspond to a predetermined number of symbol positions. In some embodiments, one or more of the windows 591-595 may be arranged such that the symbols shown therein form an array or matrix of symbols having a number of rows and columns. In the embodiment shown in FIG. 5, however, the symbols on the reels 561-565 do not form a traditional matrix of symbols having a particular number of rows and a particular number of columns. Rather, in accordance with some aspects of the present concepts, two or more of the windows 591-595 display a different number of symbol positions. For instance, the first window 591, which is to the left of and immediately adjacent to the second window 592, displays two symbol positions of the first reel 561, each symbol position bearing a single symbol in the example shown. Likewise, the second window 592, which is in between and immediately adjacent to the first and third windows 591, 593, displays three symbol positions of the second reel 562, each symbol position bearing a single symbol in the example shown. Similarly, the third window 593, which is in between and immediately adjacent to the second and fourth windows 592, 594, displays four symbol positions of the third reel 563, each symbol position bearing a single symbol in the embodiment shown. The fourth window 592, which is in between and immediately adjacent to the third and fifth windows 593, 595, displays five symbol positions of the fourth reel 564, each symbol position bearing a single symbol in the example shown. Finally, the fifth window 595, which is to the right of and immediately adjacent to the fourth window 594, displays six symbol positions of the fifth reel 565, each symbol position bearing a single symbol. In alternate aspects, the windows 591-595 may individually or collectively display greater or fewer symbols. Moreover the sixth window 596 seen in FIG. 6, which is to the right of and immediately adjacent to the fifth window 595, displays seven symbol positions of the sixth reel 565, each symbol position bearing a single symbol in the embodiment shown.

The exemplary wagering game 560 of FIG. 5 includes a REEL BOOST™ feature in accordance with an example of the present disclosure. In an aspect of the REEL BOOST™ feature, the probability that a particular window will include a symbol clump as part of a randomly selected outcome of the wagering game decreases (or, inversely, increases) between at least two of the windows. By way of example, the probability that one of the windows 591-595 will be filled with one of the symbol clumps borne by the reel associated therewith as part of an outcome varies from window-to-window in a left to right direction (or, inversely, right to left) along the display 514. In accordance with a representative arrangement, there is a 50% chance that the first window 591 will be filled with a symbol clump on any given play of the wagering game 560. Moreover, on any given play of the wagering game 560, there may be a 33% chance that the second window 592 will be filled with a symbol clump, a 25% chance that the third window 593 will be filled with a symbol clump, a 20% chance that the fourth window 594 will be filled with a symbol clump, and approximately a 16% chance that the fifth window 595 will be filled with a symbol clump. As per FIG. 6, there is approximately a 14% chance that the sixth window 596 will be filled with a symbol clump on any given play of the wagering game 560. Put another way, in certain aspects of the present concepts, the probability that a particular window will include a symbol clump as part of a randomly selected outcome of the wagering game is equal to 1 divided by the number of symbol positions shown in that window. Recognizably, the percentages provided above are merely exemplary in nature, and are not intended as limiting.

The aspect of the REEL BOOST™ feature discussed in the preceding paragraph may be accomplished in a variety of different ways. In a representative configuration, every symbol on each of the reels 561-565 is part of a corresponding clump of symbols on the reel. By way of example, all of the Zeus symbols on the second reel 562 in FIG. 5 are part of a clump of Zeus symbols, and all of the wreath symbols on the second reel 562 are part of a clump of wreath symbols. Likewise, all of the Zeus symbols on the third reel 563 in FIG. 5 are part of a clump of Zeus symbols, and all of the Spartan helmet symbols on the third reel 563 are part of a clump of Spartan helmet symbols. As another example, all of the Zeus symbols on the fourth reel 564 in FIG. 5 are part of a clump of Zeus symbols, and all of the pot symbols on the fourth reel 564 are part of a clump of pot symbols.

In addition, the aspect of the REEL BOOST™ feature discussed above may require that every symbol clump borne by a particular reel occupies the same number of symbols or symbol positions on the particular reel. For instance, all of the symbol clumps on the first reel 561 may consist of two symbols occupying two adjacent symbol locations on the first reel 561, while all of the symbol clumps on the second reel 562 may consist of three symbols occupying three adjacent symbol locations on the second reel 562, all of the symbol clumps on the third reel 563 may consist of N symbols occupying N adjacent symbol locations on the third reel, etc. Also, the aspect of the REEL BOOST™ feature discussed above may require that there are no back-to-back clumps on any particular reel. In other words, no two symbol clumps on any particular reel are adjacent one another. For example, every clump of Zeus symbols on the second reel 562 is separated by a clump of intervening non-Zeus symbols or a non-Zeus symbol, and every clump of wreath symbols on the second reel 562 is separated by a clump of intervening non-wreath symbols or a non-wreath symbol, etc. Optionally, each of the symbol clumps on a particular one of the reels is separated by at least one symbol position.

Finally, the aspect of the REEL BOOST™ feature discussed above may require that each clump occupy a preselected number of symbols/symbol positions corresponding to the number of symbols/symbol positions shown through the window associated with the respective reel bearing the clump. In FIG. 5, for example, the first window 591 displays two symbol locations; accordingly, all of the clumps borne by the first reel 561 consist of two symbols occupying two adjacent symbol locations. In a similar regard, the second window 592 displays three symbol locations; accordingly, all of the clumps borne by the second reel 562 consist of three symbols occupying three adjacent symbol locations. Finally, since the third, fourth, and fifth windows 593, 594, 595 display three, four, and five symbol locations, respectively, all of the clumps borne by the third, fourth, and fifth reels 563, 564, 565, respectively, consist of three, four, and five symbols occupying three, four, and five adjacent symbol locations, respectively. Optionally, all of the reels bear the same number of symbols or symbol positions (e.g., are the same length).

The probability that a given window 591-595 will be filled with a symbol clump as part of a randomly selected outcome of the wagering game 560 can be modified in a variety of ways. By way of non-limiting example, the probability may be modified as a function of the length of the reel (e.g., the number of symbols or symbol positions borne by the reel) associated with that window, or as a function of the number and/or size of the clumps on the reel associated with that window. Another means is by increasing or decreasing the number of symbols and/or symbol positions displayed in the window.

According to another aspect of the REEL BOOST™ feature, every winning outcome of the wagering game 560 includes at least five winning paylines, and in some aspects at least eight winning paylines, and in further aspects at least eleven winning paylines. These aspects of the REEL BOOST™ feature may be accomplished in a variety of different ways, including the first, second and third reels 561-563 being evaluated in a scatter pay format, with the last two reels 564, 565 being evaluated in a standard branch-pay format. As a result, the wagering game 560 of FIG. 5 can provide over 100, and in some aspects at least 112, different payline options.

In FIG. 5, for example, there are eight winning paylines. By way of clarification, if the reels 561-565 were labeled A-E, respectively, and each symbol position shown through the window 591-595 numbered accordingly from top to bottom, each reel and position in FIG. 5 can be represented as:

| | | | | |
|---|---|---|---|---|
| | | | | E1 |
| | | | D1 | E2 |
| | | C1 | D2 | E3 |
| | B1 | C2 | D3 | E4 |
| A1 | B2 | C3 | D4 | E5 |
| A2 | B3 | C4 | D5 | E6 |

In this example, the eight winning combinations are as follows: Win 1=A1, B1, C1, D1, E1 (3 Zeus); Win 2=A1, B1, C1, D1, E2 (3 Zeus); Win 3=A1, B1, C1, D2, E2 (5 Zeus); Win 4=A1, B1, C1, D2, E3 (5 Zeus); Win 5=A2, B1, C1, D1, E1 (3 Zeus); Win 6=A2, B1, C1, D1, E2 (3 Zeus); Win 7=A2, B1, C1, D2, E2 (5 Zeus); and Win 8=A2, B1, C1, D2, E3 (5 Zeus).

Figure 7:
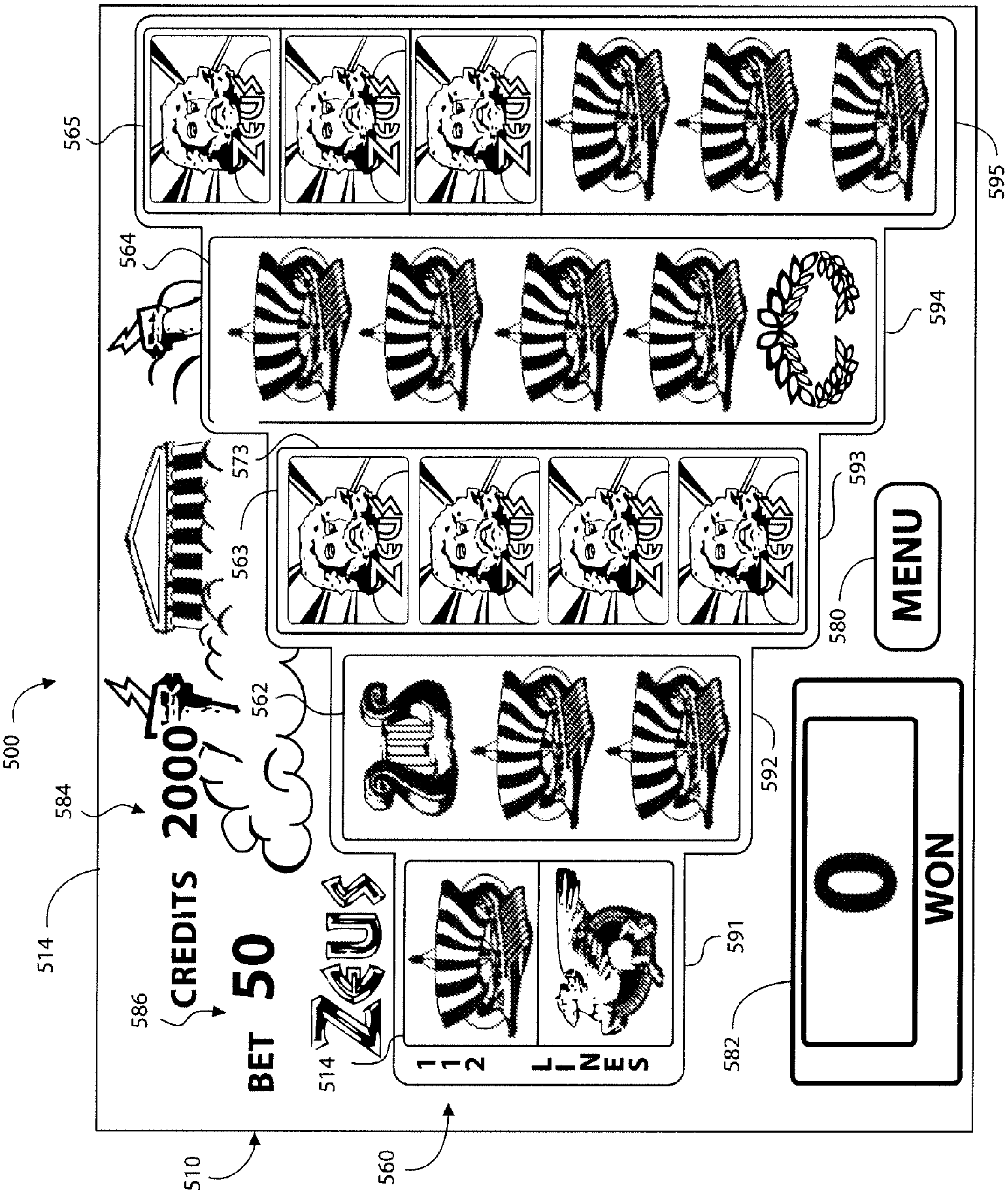
FIG. 7 is a screen shot of a display displaying an exemplary wagering game with a REEL BOOST™ feature in accordance with an embodiment of the present invention, showing a representative triggering event that triggers a stacked wild feature.

Turning next to FIG. 7, shown is an exemplary screen shot of the display 514 of the gaming device or terminal 510 of FIG. 5 illustrating a triggering event activating a stacked wild feature in accordance with an aspect of the present disclosure. The example of FIG. 7 depicts a gaming system 500 where a symbol-driven triggering event causes a stacked wild feature. The symbol-driven triggering event in this example includes a particular outcome or arrangement of symbols in the wagering game 560. For example, the various symbols borne by one or more of the reels 561-565 include multiple top-award symbols (e.g., symbols which singly and/or cooperatively produce top-award winning outcomes); one such top-award symbol being exemplified by the Zeus symbol 573. As seen in FIG. 7, the stacked wild feature is triggered when each of the windows 591-595 is filled with one or more top-award symbols 990 appearing in an outcome of the wagering game 560. In other aspects, the triggering event may include time-based triggers where the stacked wild feature is initiated after a certain amount of time has elapsed. Moreover, the trigger may be a randomly selected event, such that the stacked wild feature is initiated. In yet other implementations, triggering events may include a threshold time playing a wagering game 560 (time on device), total wagers input meeting a predetermined amount (coin in), accumulation of a certain amount of credits, points, or assets, satisfaction of a predetermined number of sequential winning outcomes, etc.

Figure 8:
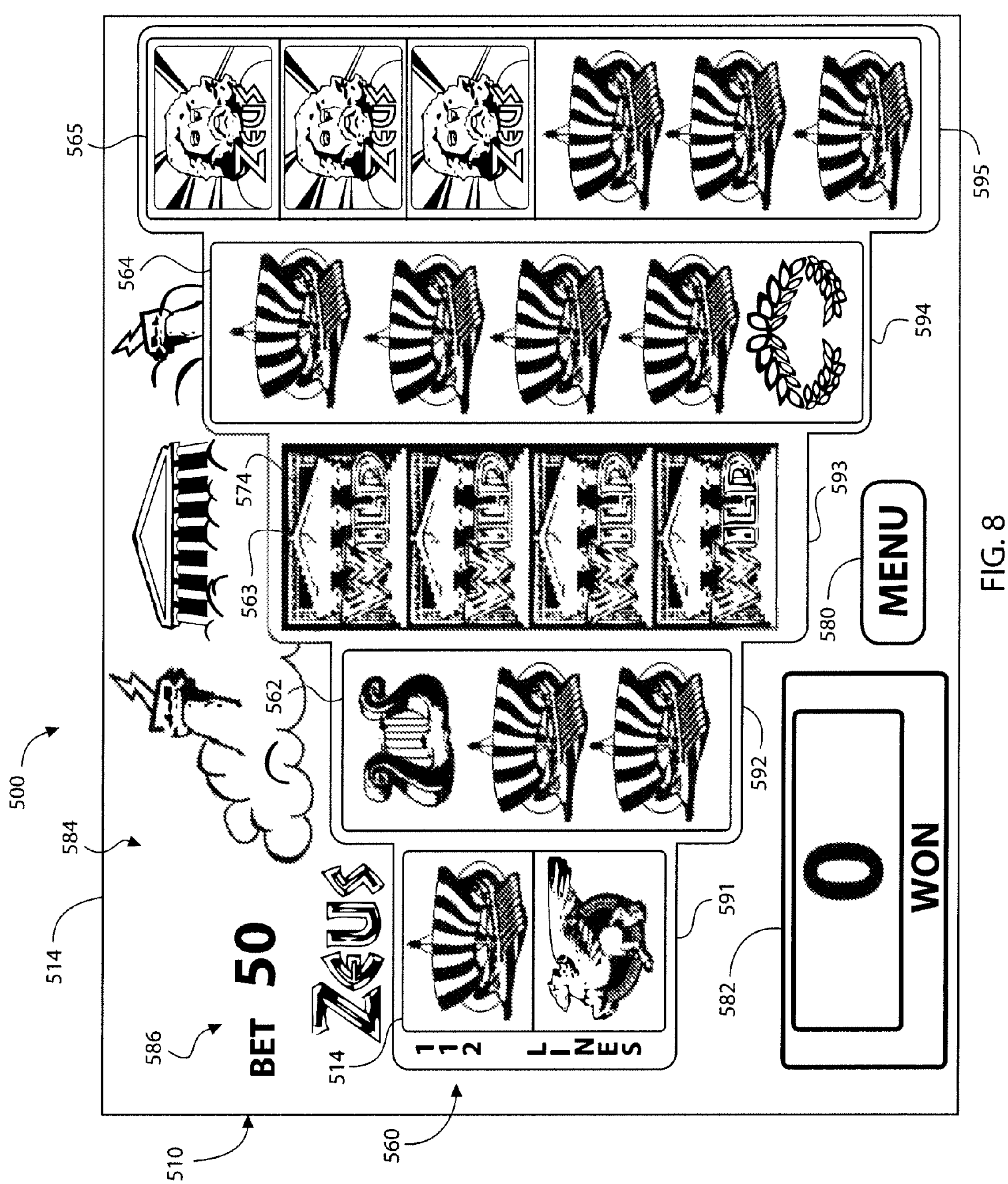
FIG. 8 is a screen shot of a display displaying the wagering game of FIG. 7, showing a reel window being filled with wild symbols in response to the triggering event.

In response to the occurrence of the triggering event (e.g., the outcome of the wagering game 560 including at least one window, such as the third window 593 in FIG. 7, being filled with top-award symbols, such as the Zeus symbol 573), each of the top-award symbols 573 in that window is replaced with a wild symbol 574, as seen in FIG. 8. In the embodiment shown, each wild symbol 574 substitutes for any other standard symbol 581 to complete or to form winning combinations in each wagering game 560. In an optional configuration, each of the top-award symbols 573 in the third window 563 of FIG. 7 may be replaced with a super wild symbol (not shown), which acts like the wild symbol 574, but additionally offers an enhancement thereto, such as a multiplier.

Figure 9:
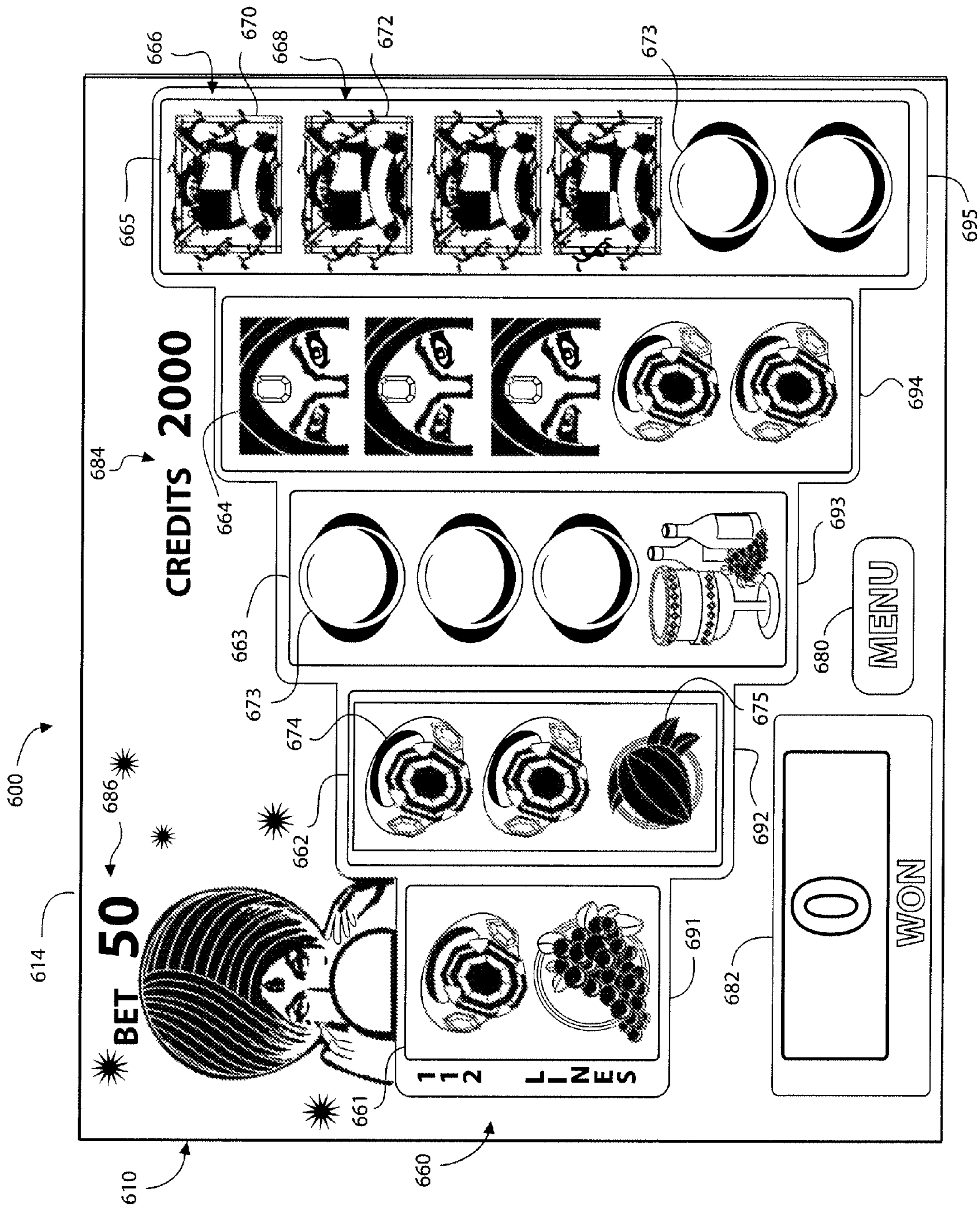
FIG. 9 is a screen shot of a display displaying an exemplary wagering game with a REEL BOOST™ feature in accordance with an embodiment of the present invention, showing a mystery symbol feature.

Referring now to FIG. 9, a primary display 614 of a gaming device or terminal 610 of a gaming system 600 is shown. The device or terminal 610 may be a freestanding gaming device (networked or standalone) as seen in FIG. 1A, a handheld gaming device as seen in FIG. 1B, or any other device having a display 614. The display 614 may be any form of display, such as those described with reference to the free standing and handheld devices of FIGS. 1A and 1B, respectively.

The display 614 includes a display of a wagering game 660, which in this example is the slot game shown in FIG. 9. The wagering game 660 includes a plurality of symbol-bearing reels 661-665 each having a plurality of distinct symbol positions (collectively represented by first and second symbol positions 666 and 668 in FIG. 9) and bearing an array of symbols (collectively represented by first and second symbols 670 and 672 in FIG. 9), as described below. The wagering game 660 can include fewer or additional symbol-bearing reels than those shown in FIG. 9, such as the sixth reel 566 shown in FIG. 6. The symbols may include any variety of graphical symbols, emblems, elements, or representations, including symbols that are associated with one or more themes (e.g., a fortune teller theme) of the gaming terminal 610 or system 600. The symbols may also include a blank symbol or empty space. Some of the symbols in the wagering game 660 of FIG. 9 may be grouped into a corresponding clump of symbols, as described above in connection with FIG. 5. The reels 661-665 are varied (e.g., spun and stopped) to reveal combinations of symbols, which represent randomly selected outcomes of the wagering game 660, that are evaluated for winning combinations. Winning combinations of symbols landing on activated paylines (those paylines for which a wager has been received), cause awards to be paid in accordance with one or more pay tables associated with the gaming system 600.

The primary display 614 further includes certain display features for providing information and options to a player. For example, the display features may include a MENU button 680, a WON meter 682, a CREDITS meter 684, and a BET meter 686, each of which may be configured similarly to the corresponding button or meter described above with respect to FIG. 5. Fewer, additional or alternative display features may be included for presenting information/options to a player.

Each of the reels 661-665 in the wagering game 660 of FIG. 9 is associated with a respective window 691-695. As indicated above, at least a portion of the wagering game outcomes is represented by a segment of each reel 661-665 being displayed through a respective one of the windows 691-695. That is, after the reels 661-665 are varied (e.g., spun and stopped), a segment of the first reel 661 is displayed in the first window 691, a segment of the second reel 662 is displayed in the second window 692, a segment of the third reel 663 is displayed in the third window 693, a segment of the fourth reel 664 is displayed in the fourth window 694, and a segment of the fifth reel 665 is displayed in the fifth window 695. Fewer or additional windows than those shown in FIG. 9 may be included in the wagering game 660, such as, for example, the sixth window 596 shown in FIG. 6.

Each window 691-695 is sized to correspond to a predetermined number of symbol positions. In some aspects, one or more of the windows 691-695 may be arranged such that the symbols shown therethrough form an array or matrix of symbols having a number of rows and columns. In the example shown in FIG. 9, however, the symbols on the reels 661-665 do not form a traditional matrix of symbols having a particular number of rows and a particular number of columns. Rather, in accordance with some aspects of the present disclosure, two or more of the windows 691-695 display a different number of the symbol positions therethrough. For instance, the first window 691, which is to the left of and immediately adjacent to the second window 692, displays two symbol positions of the first reel 661, each symbol position bearing a single symbol in the example shown. Likewise, the second window 692, which is in between and immediately adjacent to the first and third windows 691, 693, displays three symbol positions of the second reel 662, each symbol position bearing a single symbol in the example shown. Similarly, the third window 693, which is in between and immediately adjacent to the second and fourth windows 692, 694, displays four symbol positions of the third reel 663, each symbol position bearing a single symbol in the example shown. The fourth window 692, which is in between and immediately adjacent to the third and fifth windows 693, 695, displays five symbol positions of the fourth reel 664, each symbol position bearing a single symbol in the example shown. Finally, the fifth window 695, which is to the right of and immediately adjacent to the fourth window 694, displays six symbol positions of the fifth reel 665, each symbol position bearing a single symbol. In alternate configurations, the windows 591-595 may individually or collectively display greater or fewer symbols.

Figure 6:
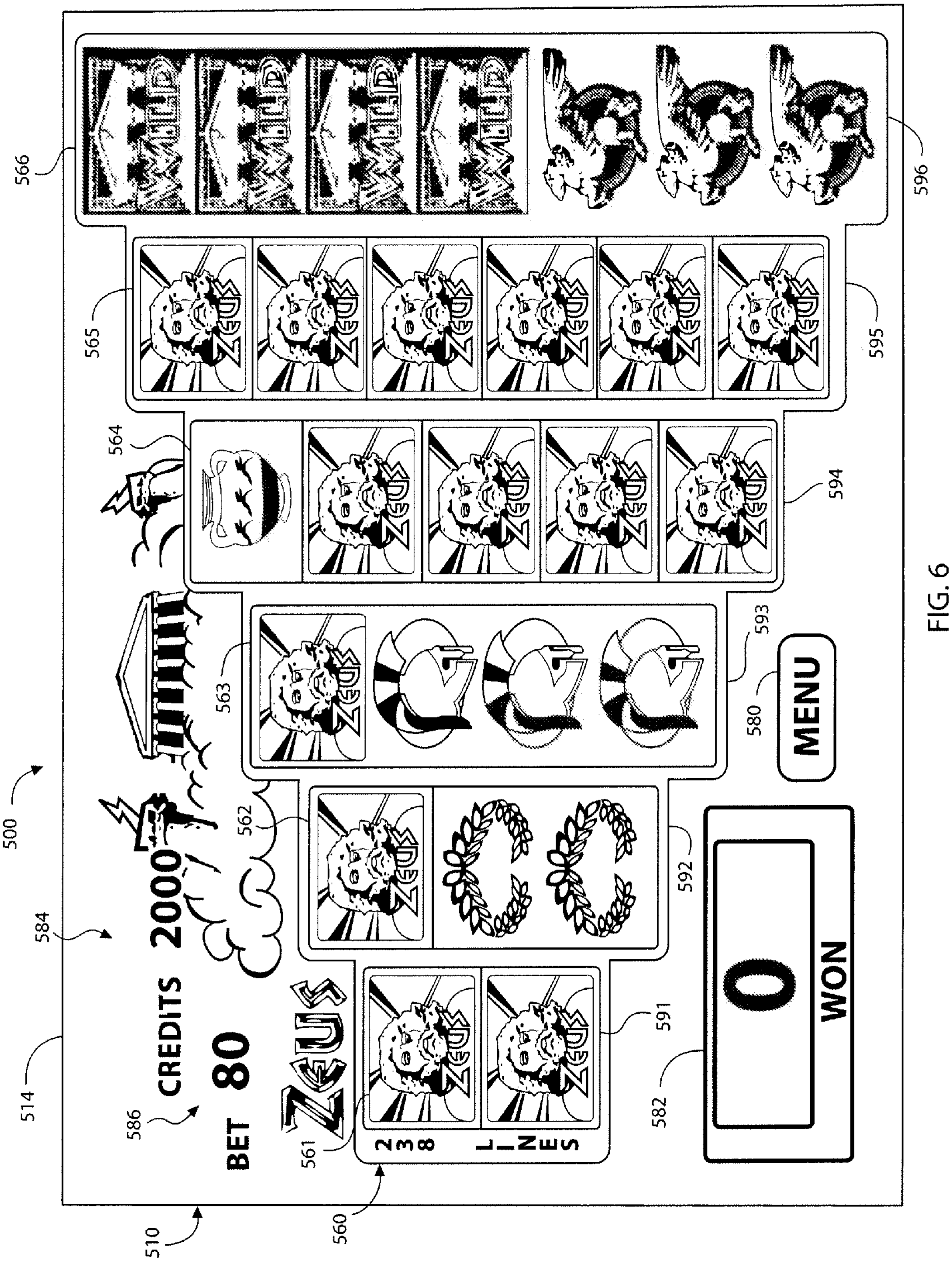
FIG. 6 is a screen shot of a display displaying an exemplary wagering game with a REEL BOOS™ feature in accordance with an embodiment of the present invention, the wagering game including six (6) symbol-bearing reels.

Similar to the example described above with respect to FIG. 5, the exemplary wagering game 660 of FIG. 6 includes a REEL BOOST™ feature. In an aspect of the REEL BOOST™ feature, the probability that a particular window will be filled with a symbol clump as part of a randomly selected outcome of the wagering game decreases (or, inversely, increases) between at least two of the windows. By way of example, the probability that one of the windows 691-695 will be filled with one of the symbol clumps borne by the reel associated therewith as part of an outcome varies from window-to-window in a direction from left to right (or, inversely, right to left) along the display 614. This aspect of the REEL BOOST™ feature may be accomplished in the same ways described above with respect to FIG. 5. Likewise, the probability that a given window 691-695 will be filled with a symbol clump as part of a randomly selected outcome of the wagering game 660 can be modified in the same ways described above with respect to FIG. 5. According to another aspect of the REEL BOOST™ feature, every winning outcome of the wagering game 660 includes at least five, and in some aspects at least ten, and in still further aspects at least eleven winning paylines. This aspect of the REEL BOOST™ feature may be accomplished in the same ways described above with respect to FIG. 5.

With continuing reference to FIG. 9, the various symbols borne by one or more of the reels 661-665 include a plurality of mystery symbols, exemplified in the illustrated embodiment by a crystal ball symbol 673. Each mystery symbol (e.g., crystal ball symbol 673) that is part of an outcome of the wagering game 660, e.g., displayed through one of the windows 691-695, is contemporaneously replaced by a replacement symbol, whereupon the displayed combination of symbols are evaluated for winning combinations. In some aspects, the replacement symbol is selected from one of the windows 691-695 other than the window(s) displaying reel(s) that are bearing mystery symbols. For example, in FIG. 9, the crystal ball symbols 673, borne by the third and fifth reels 663, 665, displayed through the third and fifth windows 693, 695 may be replaced by one or more symbols selected from the first, second and/or fourth windows 691, 692, 694. In some aspects, the replacement symbol is randomly selected from one of the reels 661-665 or windows 691-695. Continuing with the previous example, the crystal ball symbols 673 borne by the third and fifth reels 663, 665 may be replaced by a symbol that is selected at random from the second reel 662 (e.g., the chestnut symbol 674 or the ring symbol 675). Alternatively, the replacement symbol may always be selected from a single, predetermined location displayed through one of the windows 691-695.

Figure 10:
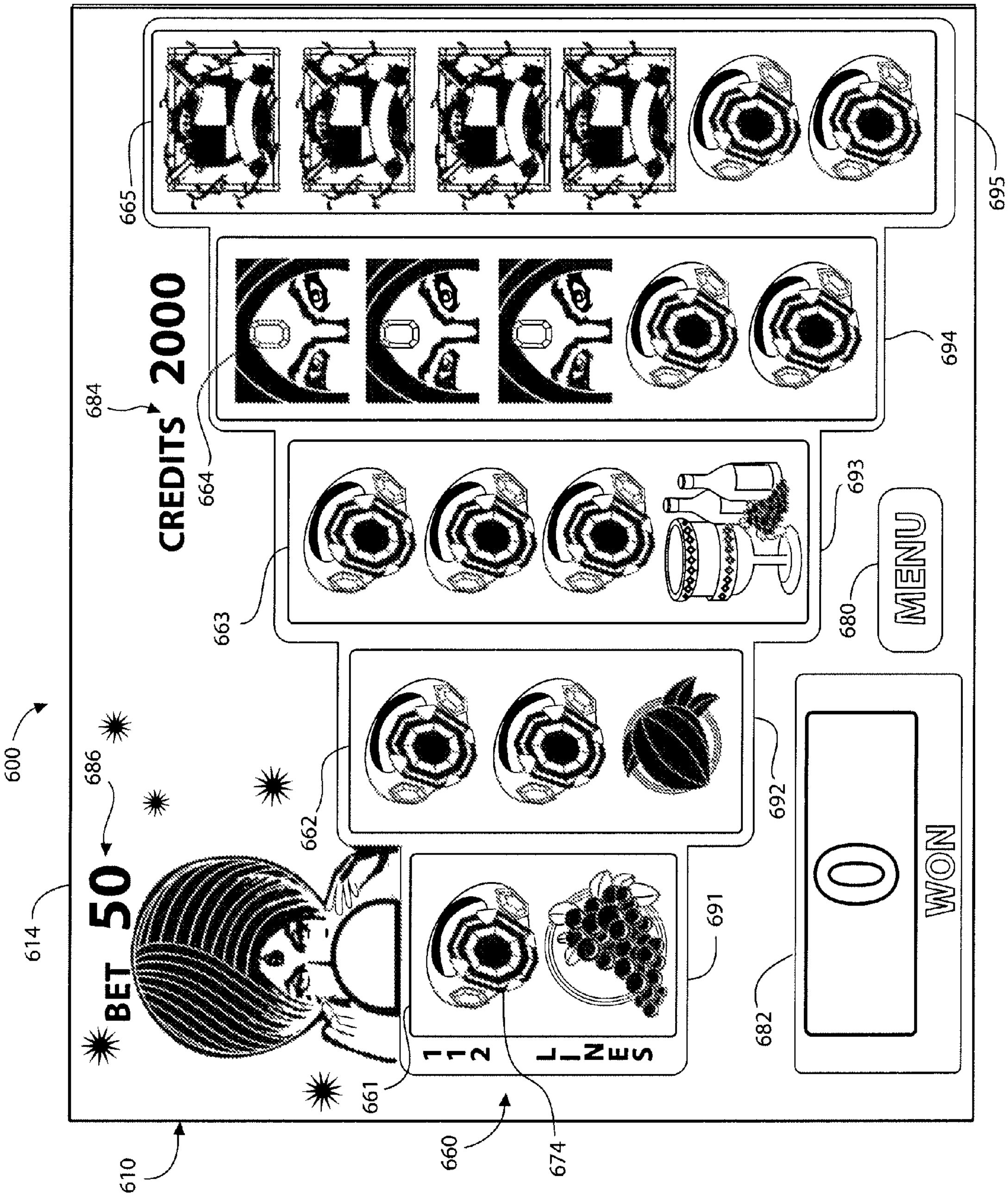
FIG. 10 is a screen shot of a display displaying the wagering game of FIG. 9, showing each of the displayed mystery symbols being replaced with a symbol that is randomly selected from one of the other reels.
Figure 11:
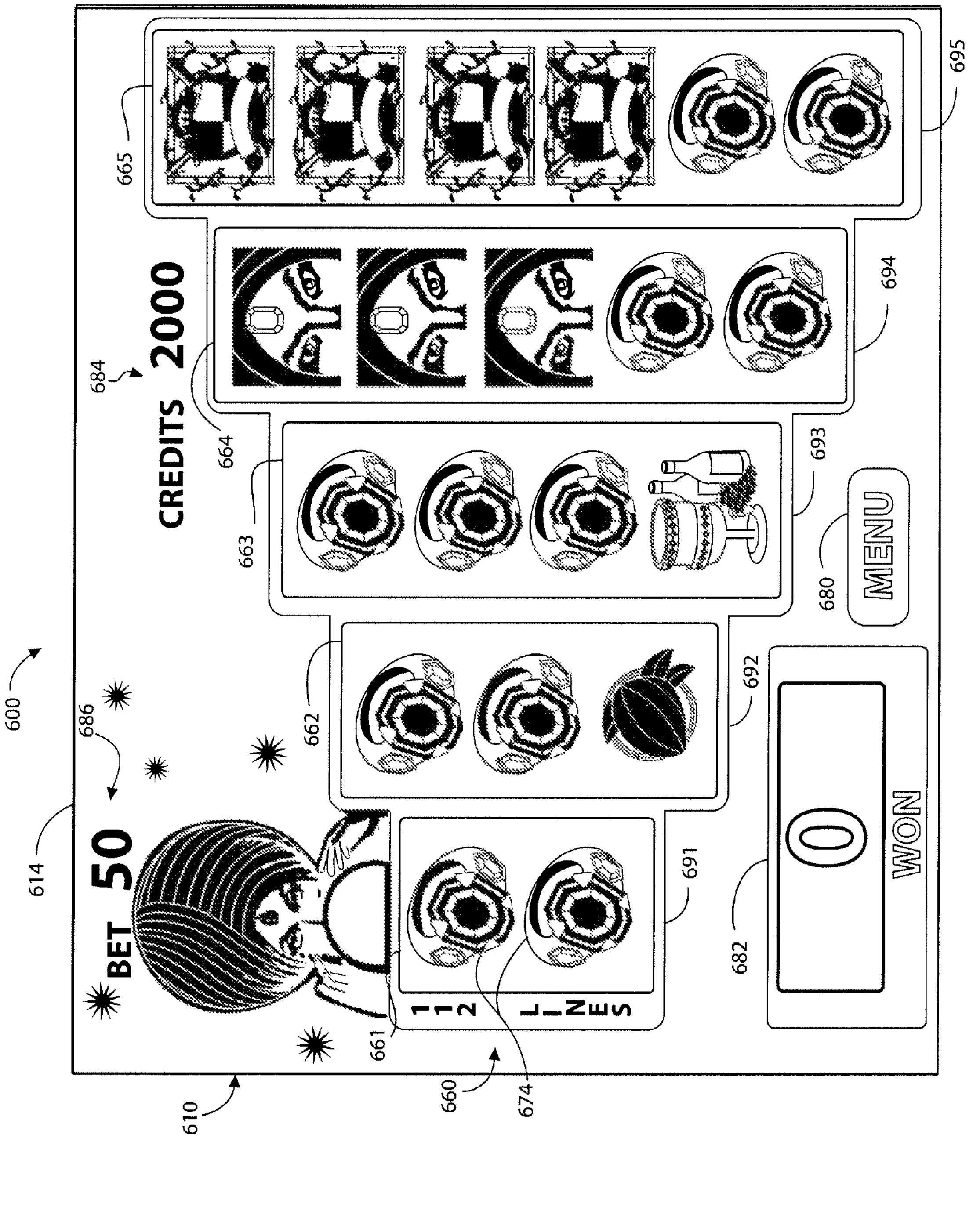
FIG. 11 is a screen shot of a display displaying the wagering game of FIG. 9, showing each of the displayed mystery symbols being replaced with a symbol that is randomly selected from the left-most reel.

In some aspects, the replacement symbol is randomly selected from a predetermined reel or window other than the reel(s) bearing/window(s) displaying mystery symbols. By way of example, the crystal ball symbols 673 in FIG. 9 that are borne by the third and fifth reels 663, 665 and displayed through the third and fifth windows 693, 695, respectively, are replaced by a symbol that is always randomly selected from the first reel 661 and displayed through the first window 691. FIG. 10 illustrates all of the crystal ball symbols 673 from FIG. 9 being replaced by the ring symbol 674 displayed through the first window 691. In accordance with one of the aspects of the REEL BOOST™ feature described above, there is a 50% chance that the first window 691 will be filled with a symbol clump (e.g., two identical symbols occupying two coterminous symbol locations) on any given play of the wagering game 660. In this instance, as seen in FIG. 11, if the first window 691 is filled with a symbol clump, e.g., two ring symbols 674, then it is guaranteed that the crystal ball symbols 673 from FIG. 9 will be replaced with a symbol from that clump, e.g., ring symbol 674.

Turning next to FIG. 12, shown is an exemplary screen shot of the display 614 of the gaming device or terminal 610 of FIG. 9, illustrating a triggering event activating a wild reel feature in accordance with an implementation of the present disclosure. The implementation of FIG. 12 depicts a gaming system 600 where a symbol driven triggering event causes a wild reel feature. The symbol driven triggering event in this implementation comprises a particular outcome or arrangement of symbols occurring in the wagering game 660. In other implementations, the triggering event may include time-based triggers where the stacked wild feature is initiated after a certain amount of time has elapsed. Alternately, the trigger may be a randomly selected event, such that the stacked wild feature is initiated. In yet other implementations, triggering events may include a threshold time playing a wagering game 660 (time on device), total wagers input meeting a predetermined amount (coin in), accumulation of a certain amount of credits, points, or assets, satisfaction of a predetermined number of sequential winning outcomes, etc.

In response to the occurrence of a triggering event, the order in which the windows are displayed is reversed. FIG. 11 illustrates the windows 691-695 from FIG. 9, which are arranged therein from left-to-right, being rearranged therein from right-to-left such that the first window 691 is the right-most window and the fifth window 695 is the left-most window. In some embodiments, the order of the windows 691-695 is reversed for only a predetermined number of spins (e.g., "7 FREE SPINS" in FIG. 12) such that subsequent to the predetermined number of spins, the order of the windows is changed again (e.g., reverted back to the order presented in FIG. 9). The associated probability of a particular window including a symbol clump as part of the game outcome is also reversed for the exemplary wagering game 660 depicted in FIG. 11, such that instead of decreasing from left to right, the probability increases from left to right.

Figure 13:
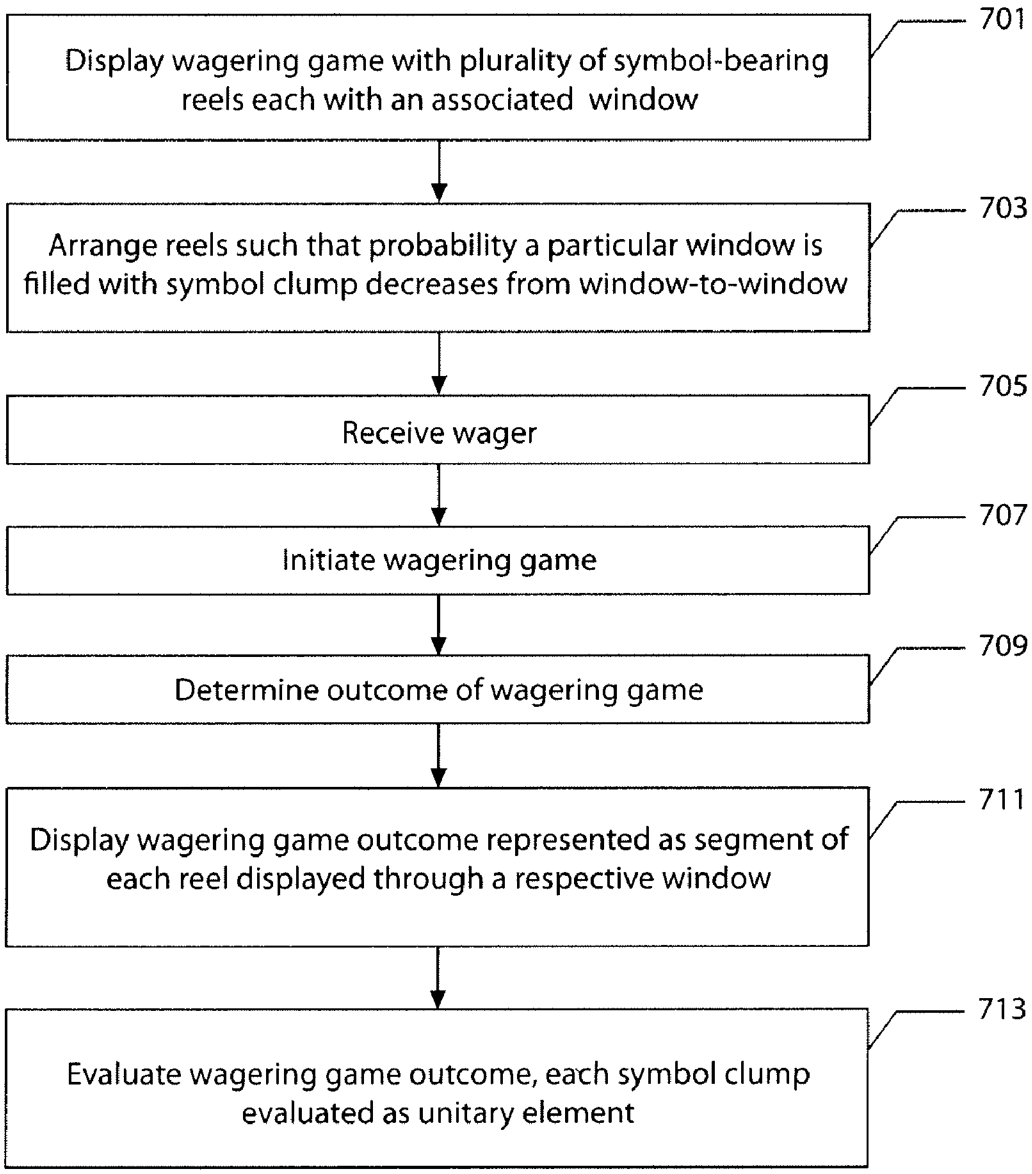
FIG. 13 is a flowchart for an algorithm that corresponds to instructions executed by a controller in accord with at least some aspects of the disclosed concepts.

FIG. 13, described by way of example above, represents one algorithm that corresponds to at least some instructions executed by the controller 42 and/or external systems 46 in FIG. 2 to perform the above described functions associated with the disclosed concepts. By way of non-limiting example, the exemplary algorithm 700 of FIG. 13 includes, at block 701, displaying a wagering game with a plurality of symbol bearing reels, such as reels 561-565 of FIG. 5. Each of the reels has a window, such as windows 591-595 of FIG. 5, associated therewith. At block 703, the reels are arranged such that the probability a particular window will be filled with a symbol clump as part of a randomly selected outcome of the wagering game decreases (or, inversely, increases) between at least two of the windows. It is contemplated that block 703 be a preestablished aspect of the wagering game, and therefore need not be an instruction executed by the controller 42 and/or external systems 46 in FIG. 2.

At block 705, a wager is placed or otherwise confirmed (e.g., via bill validator 20, coin acceptor 22, information reader 24 of FIG. 1A), whereat play of the wagering game is initiated at block 707. At blocks 709 and 711, respectively, the outcome of the wagering game is determined, and the wagering game outcome displayed (e.g., as described above with respect to FIG. 1A. The wagering game outcome is at least partially represented as segment of each reel being displayed through a respective window. At block 713, the wagering game outcome is evaluated, each symbol clump being evaluated as unitary element.

In some embodiments, the method includes at least those steps enumerated above. It is also within the scope and spirit of the present invention to omit steps, include additional steps, and/or modify the order presented above. It should be further noted that the method represents a single change in appearance. However, it is expected, as indicated above, that the method be applied in a systematic and repetitive manner.

While many preferred embodiments and best modes for carrying out the present invention have been described in detail above, those familiar with the art to which this invention relates will recognize various alternative designs and embodiments for practicing the invention within the scope of the appended claims.

The invention claimed is:

1. A gaming device for playing a wagering game, the gaming device comprising:

a wager input device configured to receive an indication of a wager to play the wagering game, the wagering game including:

a plurality of reels each having a plurality of distinct symbol positions and bearing a plurality of symbols, at least two of the reels each bearing at least one of a plurality of symbol clumps, and a plurality of windows each of which is associated with a respective one of the plurality of reels, the plurality of windows including at least a first window and a second window being different in size so as to display therethrough a different number of the distinct symbol positions; and a display configured to display an outcome of the wagering game selected from a plurality of outcomes, at least a portion of the plurality of outcomes being represented by a segment of each reel being displayed through a respective one of the plurality of windows, wherein the respective reels associated with at least the first and second windows differ in at least one of a number of the plurality of distinct symbol positions, an arrangement of the plurality of symbols, and a number of the plurality of symbol clumps such that a probability of a particular one of the first and second windows including at least one of the plurality of symbol clumps as part of the displayed outcome in the wagering game decreases between at least the first and second windows.

2. The gaming device of claim 1, wherein each of the symbol clumps comprises one or more identical symbols occupying two or more of the distinct symbol positions located immediately adjacent one another.

3. The gaming device of claim 2, wherein each of the symbol clumps is evaluated as a unitary element in determining whether the outcome represents a winning outcome.

4. The gaming device of claim 2, wherein the decrease in the probability is accomplished, at least in part, by every one of the symbols borne by a particular one of the reels being part of a corresponding one of the symbol clumps.

5. The gaming device of claim 2, wherein the decrease in the probability is accomplished, at least in part, by every one of the symbol clumps borne by a particular one of the reels occupying the same number of symbol positions on the particular reel.

6. The gaming device of claim 2, wherein the decrease in the probability is accomplished, at least in part, by each of the symbol clumps on a particular one of the reels being separated by at least one distinct symbol position on the particular reel.

7. The gaming device of claim 2, wherein each of the windows has a size that corresponds to a predetermined number of symbol positions, and wherein the decrease in the probability is accomplished, at least in part, by the number of the symbol positions occupied by each of the symbol clumps corresponding to the size of the respective window associated with the reel bearing the at least one symbol clump.

8. The gaming device of claim 1, wherein all of the windows vary in size so as to display therethrough a different number of the distinct symbol positions.

9. The gaming device of claim 8, wherein, in response to an occurrence of a triggering event in the wagering game, the order in which the windows are displayed is reversed.

10. The gaming device of claim 1, wherein the plurality of windows comprises the first window adjacent the second window adjacent a third window, the first window showing fewer of the distinct symbol positions therethrough than the second or third windows, and the second window showing fewer of the distinct symbol positions therethrough than the third window.

11. The gaming device of claim 1, wherein the plurality of symbols includes a plurality of mystery symbols, each of the mystery symbols shown through one of the windows as part of an outcome being replaced by a symbol selected from one of the other reels.

12. The gaming device of claim 11, wherein each of the mystery symbols shown through one of the windows is replaced by a symbol shown through a preselected other one of the windows.

13. The gaming device of claim 1, wherein the plurality of symbols includes a plurality of top-award symbols, and wherein, in response to the outcome including at least one of the windows being filled with the top-award symbols, each of the top-award symbols in the at least one window is replaced by a wild symbol.

14. The gaming device of claim 1, wherein the windows are arranged left to right on the display and the number of symbol positions revealed through each of the windows increases from left to right such that the probability decreases from left to right.

15. A gaming system comprising:

means for receiving an indication of a wager to play a wagering game, the wagering game including a plurality of reels each having a plurality of distinct symbol positions and bearing a plurality of symbols, at least some of the symbols being grouped into corresponding ones of a plurality of symbol clumps, each of the symbol clumps comprising one or more identical symbols occupying two or more of the distinct symbol positions located immediately adjacent one another on one of the reels;

means for receiving input from the player; and means for displaying an outcome of the wagering game, the outcome being randomly selected from a plurality of wagering game outcomes, at least a portion of the wagering game outcomes being represented by a segment of each reel being displayed through a respective one of a plurality of windows, the plurality of windows including at least a first window and a second window being different in size so as to display therethrough a different number of the distinct symbol positions, wherein the reels associated with at least the first and second windows differ in at least one of a number of the plurality of distinct symbol positions, an arrangement of the plurality of symbols, and a number of the plurality of symbol clumps such that a probability of a particular one of the first and second windows including one of the plurality of symbol clumps as part of the displayed outcome in the wagering game decreases from window-to-window in a direction along the means for displaying.

16. The gaming system of claim 15, wherein each of the symbol clumps is evaluated as a unitary element in determining whether the outcome represents a winning outcome.

17. The gaming system of claim 15, wherein the probability decreasing from window-to-window includes every one of the symbols borne by a particular one of the reels being part of a corresponding one of the symbol clumps, and every one of the symbol clumps borne by a particular reel occupying the same number of the symbol positions on the particular reel.

18. The gaming system of claim 15, wherein each of the windows has a size that corresponds to a predetermined number of the distinct symbol positions, and wherein the probability decreasing from window-to-window includes the number of the distinct symbol positions occupied by each of the symbol clumps corresponding to the size of the respective window associated with the reel bearing the symbol clump such that the respective window is completely filled by a corresponding one of the symbol clumps.

19. The gaming system of claim 15, wherein the plurality of windows comprises the first window displaying only two distinct symbol positions therethrough, the second window displaying only three distinct symbol positions therethrough, and a third window displaying only four distinct symbol positions therethrough.

20. The gaming system of claim 19, wherein, in response to a triggering event in the wagering game, the order in which the first, second and third windows are displayed via the means for displaying is reversed.

21. The gaming system of claim 15, wherein the plurality of symbols includes a plurality of mystery symbols, each of the mystery symbols shown through one of the windows as part of an outcome being replaced by a symbol randomly-selected from a preselected one of the other reels.

22. The gaming system of claim 15, wherein the plurality of symbols includes a plurality of top-award symbols, and wherein, in response to the outcome including at least one of the windows being filled with a clump of the top-award symbols, each of the top-award symbols in the clump of top-award symbols is replaced by a wild symbol.

23. A method of conducting a wagering game for a player, the method comprising:

initiating the wagering game using at least one processor, the wagering game including a plurality of reels each having a plurality of distinct symbol positions and bearing a plurality of symbols, at least some of the symbols being grouped into corresponding ones of a plurality of symbol clumps, each of the symbol clumps comprising one or more identical symbols occupying two or more of the distinct symbol positions located immediately adjacent one another on one of the reels;

determining, via the at least one processor, an outcome of the wagering game, the outcome being randomly selected from a plurality of wagering game outcomes; and causing at least one display device to display the wagering game outcome, the wagering game outcome being represented as a segment of each of the reels being displayed through a respective one of a plurality of windows, the plurality of windows including at least a first window and a second window being different in size so as to display therethrough a different number of the distinct symbol positions, wherein the reels associated with the first and second windows differ in at least one of a number of the plurality of distinct symbol positions, an arrangement of the plurality of symbols, and a number of the plurality of symbol clumps such that a probability of a particular one of the first and second windows including one of the plurality of symbol clumps as part of the displayed wagering game outcome decreases from window-to-window in a direction along the at least one display device.

24. A computer program product comprising a non-transient computer readable medium having an instruction set borne thereby, the instruction set being configured to cause, upon execution by one or more controllers, the acts of:

initiating a wagering game using at least one processor, the wagering game including a plurality of reels each having a plurality of distinct symbol positions and bearing a plurality of symbols, at least some of the symbols being grouped into corresponding ones of a plurality of symbol clumps, each of the symbol clumps comprising one or more identical symbols occupying two or more of the distinct symbol positions located immediately adjacent one another on one of the reels;

determining, via at least one processor, an outcome of the wagering game, the outcome being randomly selected from a plurality of wagering game outcomes; and causing at least one display device to display the wagering game outcome, the wagering game outcome being represented as a segment of each of the reels being displayed through a respective one of a plurality of windows, the plurality of windows being different in size so as to each display therethrough a different number of the distinct symbol positions;

wherein the reels associated with each of the windows differ in at least one of a number of the plurality of distinct symbol positions, an arrangement of the plurality of symbols, and a number of the plurality of symbol clumps such that a probability of a particular one of the plurality of windows including one of the plurality of symbol clumps as part of the displayed wagering game outcome decreases from window-to-window in a direction along the at least one display device.

* * * * *